United States Patent
Kanayama

(10) Patent No.: US 8,384,260 B2
(45) Date of Patent: Feb. 26, 2013

(54) GEARED MOTOR ASSEMBLY

(75) Inventor: Naoki Kanayama, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 359 days.

(21) Appl. No.: 12/682,616

(22) PCT Filed: Feb. 3, 2009

(86) PCT No.: PCT/JP2009/000417
§ 371 (c)(1), (2), (4) Date: Apr. 12, 2010

(87) PCT Pub. No.: WO2010/089796
PCT Pub. Date: Aug. 12, 2010

(65) Prior Publication Data
US 2011/0116962 A1 May 19, 2011

(51) Int. Cl.
*H02K 7/06* (2006.01)
*F16H 35/00* (2006.01)
(52) U.S. Cl. ............. 310/83; 310/90; 74/640
(58) Field of Classification Search .......... 310/83, 310/90; 74/640, 411, 421 A, 424; 475/149, 475/341, 345
See application file for complete search history.

(56) References Cited

U.S. PATENT DOCUMENTS

| 6,817,267 | B2 * | 11/2004 | Kobayashi et al. ........... 74/640 |
| 2002/0007697 | A1 * | 1/2002 | Tanioka et al. ............. 74/640 |
| 2002/0135241 | A1 | 9/2002 | Kobayashi et al. |
| 2006/0192517 | A1 * | 8/2006 | Miyashita et al. ........... 318/652 |
| 2008/0098839 | A1 | 5/2008 | Maruyama et al. |

FOREIGN PATENT DOCUMENTS

| JP | 2002-243000 A | 8/2002 |
| JP | 2006-144971 A | 6/2006 |
| JP | 2006-271189 A | 10/2006 |
| JP | 2007-263188 A | 10/2007 |
| JP | 2008-115896 A | 5/2008 |

OTHER PUBLICATIONS

International Search Report for PCT/JP2009/000417 completed Apr. 27, 2009.

* cited by examiner

*Primary Examiner* — Tran N. Nguyen
*Assistant Examiner* — Leda Pham
(74) *Attorney, Agent, or Firm* — Buchanan Ingersoll & Rooney PC

(57) ABSTRACT

A geared motor assembly has a rotation-transmitting shaft for transferring output rotation of a reducer on the front side of a motor to an output shaft sensor on the rear side of the motor. A front end portion of the rotation-transmitting shaft is securely bonded to a rotation output member of the reducer by an adhesive that exhibits flexibility or elasticity after hardening, and a rear end portion of the rotation-transmitting shaft is rotatably supported by a sensor cover via a bearing in a position adjacent to the output shaft sensor. The rotation-transmitting shaft can be supported in a state free of axial runout by deformation of the adhesive and by the bearing. Consequently, the rotation angle position of the rotation output member can be detected with precision by the output shaft sensor in a position adjacent to the bearing.

5 Claims, 2 Drawing Sheets

GEARED MOTOR ASSEMBLY

TECHNICAL FIELD

The present invention relates to a geared motor assembly in which a reducer is attached to a front surface of a motor, and particularly relates to the improvement of a geared motor assembly in which an output shaft sensor for detecting the rotational state, including the rotation angle and other characteristics, of an output shaft of a reducer is disposed on a rear side of a motor.

BACKGROUND ART

A geared motor assembly configured so as to output the output rotation of a motor via a reducer having high transmission precision is used in a drive component requiring a high degree of positioning precision in an industrial robot, a machine tool, or the like. As disclosed in Patent Document 1, a known example of such a geared motor assembly is a configuration in which the output shaft rotation of a reducer disposed on the front side of a motor is transferred to the rear side of the motor via a rotation-transmitting shaft disposed as being passed through a hollow part of a hollow motor shaft, and the rotation angle of the reducer output shaft is detected by an angle sensor disposed on the rear side of the motor.

Patent Documents 2 and 3 disclose configurations of a geared motor assembly in which a sleeve extending in the axial direction through the center of the assembly is provided, and the front end of the sleeve is connected to a rotation output member of a reducer.

[Patent Document 1] Japanese Laid-open Patent Application No. 2006-271189

[Patent Document 2] Japanese Laid-open Patent Application No. 2006-144971

[Patent Document 3] Japanese Laid-open Patent Application No. 2002-243000

DISCLOSURE OF THE INVENTION

Problems the Invention is Intended to Solve

In a conventional geared motor assembly in which the output rotation of a reducer on the front side of the motor is transferred to the rear side of the motor via a rotation-transmitting shaft, the rotation-transmitting shaft is supported in a cantilever fashion wherein the front end is securely connected to the rotation output member of the reducer. Therefore, an angle sensor is disposed on the rear end side portion of the rotation-transmitting shaft, i.e., on the portion on the free end side. When the rotation-transmitting shaft has been installed with poor precision, a large amount of axial runout occurs along with the rotation in the portion on the free end side of the rotation-transmitting shaft. It is possible for this axial runout to have harmful results, such as a loss in the detection precision of the angle sensor.

Since the rotation-transmitting shaft is a member that is not involved with torque transmission or the like, a thin sleeve is commonly used. Therefore, the rotation-transmitting shaft is readily deformed by the moment load of the reducer output shaft and other external forces. When the rotation-transmitting shaft deforms, harmful results could possibly occur, such as the detection precision of the angle sensor decreasing.

Means to Solve the Problems

In order to resolve the problems described above, the geared motor assembly of the present invention is characterized in comprising:

a hollow motor having a hollow motor shaft;

a reducer coaxially attached to a front side of the hollow motor;

a rotation-transmitting shaft extending coaxially through a hollow part of the hollow motor shaft;

a motor shaft sensor for detecting the state of rotation of the hollow motor shaft;

an output shaft sensor disposed on a rear end portion of the rotation-transmitting shaft protruding rearward from a rear end opening of the hollow motor shaft in order to detect the state of rotation of a rotation output member of the reducer;

an adhesive for fixing a front end of the rotation-transmitting shaft to the rotation output member of the reducer; and a bearing for rotatably supporting the rear end portion of the rotation-transmitting shaft in a position adjacent to the output shaft sensor; wherein the adhesive is an adhesive that exhibits a predetermined flexibility or elasticity after hardening.

In the geared motor assembly of the present invention, the rotation-transmitting shaft, which is used to transfer the output rotation of the reducer to the side of the output shaft sensor disposed on the rear side of the motor, is supported at both ends. Specifically, the front end of the rotation-transmitting shaft is fixed to the reduced rotation output member by the adhesive, and the rear end portion thereof is supported by the bearing. Therefore, the axial runout in the rear end portion of the rotation-transmitting shaft can be suppressed more so than in a case of supporting in a cantilever fashion. Since the adhesive has a predetermined flexibility or elasticity, the rotation-transmitting shaft can be disposed between the reduced rotation output member and the bearing in a state free of axial runout, due to the deformation of the adhesive. Furthermore, the rotation-transmitting shaft is supported by the bearing in a position adjacent to the output shaft sensor. Therefore, it is possible to prevent the harmful effect of axial runout occurring along with the rotation of the rear end portion of the rotation-transmitting shaft, which is caused by errors in installing the rotation-transmitting shaft, external forces acting on the rotation-transmitting shaft, and other factors; and it is also possible to detect the rotation angle position and other characteristics of the reduced rotation output member with a high degree of precision.

A sliding bearing or a rolling bearing can be used as the bearing herein.

A configuration can be used in which the reducer is a hollow reducer, and a hollow part of the hollow reducer coaxially communicates with the hollow part of the hollow motor. In this case, the rotation-transmitting shaft can be disposed in a state of extending through the hollow part of the hollow reducer and the hollow part of the hollow motor.

Furthermore, the rotation-transmitting shaft is preferably a hollow shaft in the case of a hollow geared motor assembly.

The reducer can be a wave gear drive having a rigid internally toothed gear, a flexible externally toothed gear disposed on an inside of the internally toothed gear, and a wave generator for causing the flexible externally toothed gear to flex in a noncircular manner and partially mesh with the rigid internally toothed gear, and for moving the meshed position of the two gears in a circumferential direction. In this case, the flexible externally toothed gear is commonly used as the rotation output member.

EFFECTS OF THE INVENTION

In the geared motor assembly of the present invention, the rear end portion of the rotation-transmitting shaft is supported by the bearing in a position adjacent to the output shaft sensor, the rotation-transmitting shaft being disposed in order to transfer the output rotation of the reducer to the rear side of the motor, and the reducer being disposed on the front side of the motor. The front end of the rotation-transmitting shaft is securely bonded to the rotation output member of the reducer by an adhesive that exhibits flexibility or elasticity after hardening. Therefore, it is possible to suppress axial runout of the rear end portion of the rotation-transmitting shaft resulting from errors in installing the rotation-transmitting shaft, the effects of external forces, and the like; and the rotation angle and other characteristics of the rotation output member of the reducer can be detected precisely by the output shaft sensor.

BEST MODE FOR CARRYING OUT THE INVENTION

Embodiments of a geared motor assembly to which the present invention is applied are described hereinbelow with reference to the drawings.

Figure 1:
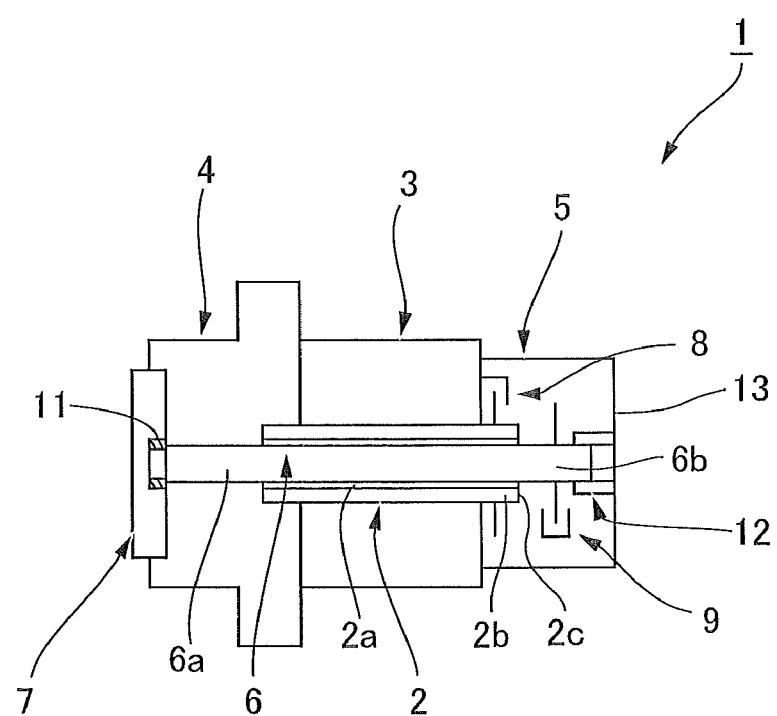
FIG. 1 is a schematic view of a geared motor to which the present invention is applied.

First, the configuration of a geared motor assembly according to the present embodiment will be described with reference to FIG. 1. A geared motor assembly 1 has a hollow motor 3 provided with a hollow motor shaft 2, a reducer 4 coaxially attached to the front side of the hollow motor 3, and a sensor part 5 disposed on the rear side of the hollow motor 3. A wave gear drive can be used as the reducer 4, but other types of reducers may also be used.

A rotation-transmitting shaft 6, disposed in order to transfer the output rotation of the reducer 4 to the rear side of the motor, extends coaxially in a rotatable state through a hollow part 2a of the hollow motor shaft 2 of the hollow motor 3. A front end portion 6a of the rotation-transmitting shaft 6 is fixed as being coaxial with a rotation output member 7 for outputting the reduced rotation of the reducer 4. The rotation-transmitting shaft 6 can be a solid shaft or a hollow shaft.

A rear end portion 2b of the hollow motor shaft 2 extends into the sensor part 5. A rear end portion 6b of the rotation-transmitting shaft 6 protrudes into the sensor part 5 from a rear end opening 2c of the hollow motor shaft 2. A motor shaft sensor 8 is disposed on the rear end portion 2b of the hollow motor shaft 2, and an output shaft sensor 9 is disposed on the rear end portion 6b of the rotation-transmitting shaft 6. The motor shaft sensor 8 and the output shaft sensor 9 are rotary encoders, for example. Other types of sensors may of course also be used.

The front end portion 6a of the rotation-transmitting shaft 6 is securely bonded to the rotation output member 7 of the reducer 4 by an adhesive 11 that exhibits flexibility or elasticity after hardening. The rear end portion 6b of the rotation-transmitting shaft 6 is supported by a sensor cover 13 in a rotatable state via a bearing 12 at a position adjacent to the rear side of the output shaft sensor 9. A sliding bearing, a ball bearing or other rolling bearing, or another form of bearing can be used as the bearing 12.

Figure 2:
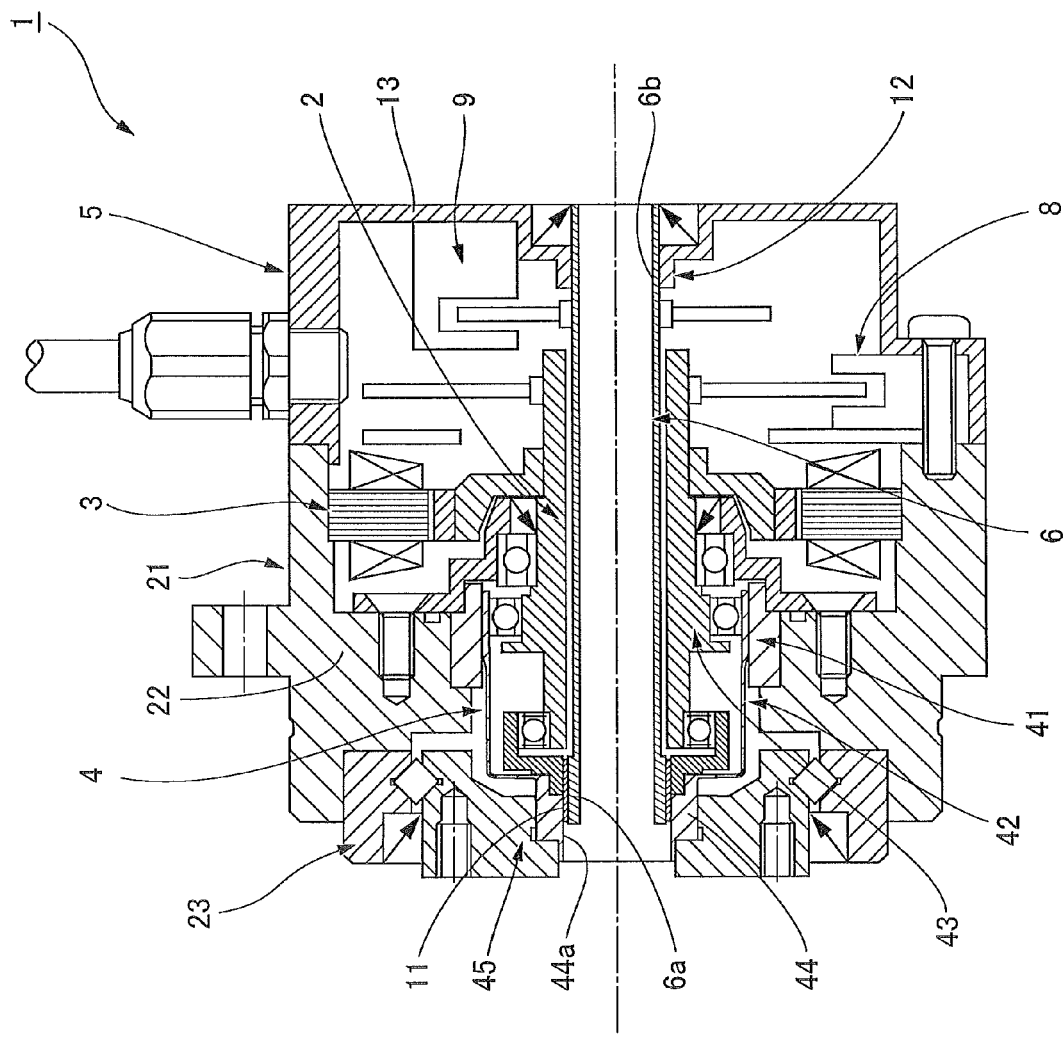
FIG. 2 is a schematic longitudinal cross-sectional view showing an embodiment of a geared motor to which the present invention is applied.

Next, a specific structural example of the geared motor assembly 1 according to the present embodiment will be described with reference to FIG. 2. The geared motor assembly 1 shown in this drawing is a hollow type of assembly, and a hollow wave gear drive 4 is incorporated inside the front side portion of a cylindrical housing 21 of the hollow motor 3.

The hollow wave gear drive 4 comprises an annular rigid internally toothed gear 41 securely fitted into the internal peripheral surface of a dividing wall 22 formed on the internal peripheral surface of the cylindrical housing 21, a cup-shaped flexible externally toothed gear 42 disposed on the inside of the internally toothed gear, and an elliptically contoured wave generator 43 fitted in the inside of the externally toothed gear. The wave generator 43 is formed integrally on the hollow motor shaft 2 in the present example. A cylindrical boss 44 is integrally formed on the bottom portion of the cup of the flexible externally toothed gear 42, and a rotation output disc 45 is coaxially secured to this cylindrical boss 44. The flexible externally toothed gear 42 and the rotation output disc 45 are the rotation output members of the wave gear drive 4. The rotation output disc 45 is rotatably supported by the internal peripheral surface of the front end side of the cylindrical housing 21 via a cross roller bearing 23.

The rotation-transmitting shaft 6 is a hollow shaft, and the front end portion 6a thereof is securely bonded by the adhesive 11 to a circular ridge 44a formed on the internal peripheral surface of the cylindrical boss 44 of the flexible externally toothed gear 42. The rear end portion 6b of the rotation-transmitting shaft 6 is rotatably supported by the cylindrical sliding bearing 12 formed integrally on the sensor cover 13.

In the geared motor assembly 1 having this configuration, the rotation of the hollow motor shaft 2 is reduced by the wave gear drive 4, and the reduced output rotation is transferred from the rotation output disc 45. The output rotation is also transferred to the rear side of the motor via the rotation-transmitting shaft 6, and the rotation angle positions and other characteristics of the rotation output members (42, 45) are detected by the output shaft sensor 9.

The rotation-transmitting shaft 6 is rotatably supported at the rear end portion 6b by the sliding bearing 12, and the position adjacent to the front side is a portion detected by the output shaft sensor 9. Therefore, axial runout of the rear end portion 6b of the rotation-transmitting shaft 6 can be suppressed, and the rotation angle position and other characteristics can be detected with a good precision. The front end portion 6a of the rotation-transmitting shaft 6 is securely bonded to the cylindrical boss 44 of the flexible externally toothed gear 42 by the adhesive 11, which has flexibility or elasticity after hardening. Therefore, even in cases in which there is an error in installing the rotation-transmitting shaft 6, the shaft can be supported by the sliding bearing 12 in a state free of installation errors, due to the deformation of the adhesive. The adhesive 11 functions as a buffer when external force acts on the rotation-transmitting shaft 6, and unnecessary stress does not act on the portion of the rotation-transmitting shaft 6 supported by the sliding bearing, nor does axial runout occur in the portion detected by the output shaft sensor. Consequently, the rotation angle position and other characteristics of the rotation output member 7 (42, 45) of the wave gear drive 4 can be detected with a good precision.

In addition, during the assembly of the rotation-transmitting shaft 6, positioning during the adhesion is preferably performed in a range made adaptable by the flexible or elastic deformation of the adhesive 11. Therefore, this can also provide the benefit of making the adhesion operation easier, in comparison with securely bonding the rotation-transmitting shaft 6 by using an adhesive that does not exhibit flexibility or elasticity after hardening.

The invention claimed is:

1. A geared motor assembly, comprising:
  a hollow motor having a hollow motor shaft;

a reducer coaxially attached to a front side of the hollow motor;
a rotation-transmitting shaft extending coaxially through a hollow part of the hollow motor shaft;
a motor shaft sensor for detecting a state of rotation of the hollow motor shaft;
an output shaft sensor disposed on a rear end portion of the rotation-transmitting shaft protruding rearward from a rear end opening of the hollow motor shaft in order to detect a state of rotation of a rotation output member of the reducer;
an adhesive for fixing a front end of the rotation-transmitting shaft to the rotation output member of the reducer; and
a bearing for rotatably supporting the rear end portion of the rotation-transmitting shaft in a position adjacent to the output shaft sensor; wherein
the adhesive is an adhesive that exhibits a predetermined flexibility or elasticity after hardening.

2. The geared motor assembly according to claim 1, wherein the bearing is a sliding bearing or a rolling bearing.

3. The geared motor assembly according to claim 1 wherein:
the reducer is a hollow reducer;
a hollow part of the hollow reducer coaxially communicates with the hollow part of the hollow motor; and
the rotation-transmitting shaft extends through the hollow part of the hollow reducer and the hollow part of the hollow motor.

4. The geared motor assembly according to claim 1, wherein the rotation-transmitting shaft is a hollow shaft.

5. The geared motor assembly according to claim 1, wherein:
the reducer is a wave gear drive having a rigid internally toothed gear, a flexible externally toothed gear disposed on an inside of the internally toothed gear, and a wave generator for causing the flexible externally toothed gear to flex in a noncircular manner and partially mesh with the rigid internally toothed gear, and for moving the meshed position of the two gears in a circumferential direction; and
the flexible externally toothed gear is the rotation output member.

* * * * *